United States Patent
Imburg (10) Patent No.: US 8,892,654 B1
(45) Date of Patent: Nov. 18, 2014

(54) MANAGING CHANGES IN SOCIAL AND GROUP GIFTING CONTEXTS

(71) Applicant: Elfster, Inc., El Cerrito, CA (US)

(72) Inventor: Peter Imburg, El Cerrito, CA (US)

(73) Assignee: Elfster, Inc., El Cerrito, CA (US)

( * ) Notice: Subject to any disclaimer, the term of this patent is extended or adjusted under 35 U.S.C. 154(b) by 0 days.

(21) Appl. No.: 14/227,226

(22) Filed: Mar. 27, 2014

Related U.S. Application Data (60) Provisional application No. 61/805,639, filed on Mar. 27, 2013.

(51) Int. Cl.
  *G06F 15/16* (2006.01)
  *G06F 15/173* (2006.01)
  *H04L 12/18* (2006.01)
(52) U.S. Cl.
  CPC .................................. *H04L 12/1813* (2013.01)
  USPC ........................................ 709/204; 709/224

(58) Field of Classification Search
  USPC .............. 709/203, 204, 224, 228; 705/29, 35, 705/36 R
  See application file for complete search history.

(56) References Cited

U.S. PATENT DOCUMENTS

| | | | | |
|---|---|---|---|---|
| 6,112,188 | A * | 8/2000 | Hartnett | 705/36 R |
| 7,593,881 | B2 * | 9/2009 | Winklevoss et al. | 705/35 |
| 8,051,184 | B2 * | 11/2011 | Roberts | 709/228 |
| 8,458,056 | B1 * | 6/2013 | Prather et al. | 705/29 |

* cited by examiner

*Primary Examiner* — Quang N Nguyen
(74) *Attorney, Agent, or Firm* — Goodwin Procter LLp (57) ABSTRACT

In an online randomized gift exchange (or any online game involving a group of participants and a draw), a system that enables additions to or deletions from the participant group after names have initially been drawn, with minimal or no disruption to the group of gift exchange participants whose names have already been drawn, which allows the mix of gift exchange participants to be changed an infinite number of times after names have initially been drawn and matchings or pairings assigned, in a series of subsequent "mini re-draws" that can occur up until the actual gift exchange event date.

14 Claims, 3 Drawing Sheets

MANAGING CHANGES IN SOCIAL AND GROUP GIFTING CONTEXTS

CROSS-REFERENCE TO RELATED APPLICATION

This application claims priority to and the benefit of provisional patent application Ser. No. 61/805,639, filed on Mar. 27, 2013, and is incorporated in its entirety herein by reference.

FIELD OF THE INVENTION

This invention relates generally to the fields of online social gifting and wishing, online randomized gift exchanges, social networking, online communication, and online group coordination and games, and, more specifically, to techniques and systems for managing changes in such contexts.

BACKGROUND

Randomized gift exchanges and other multi-party, social gift exchanges such as "secret Santa" and "yankee swap" gift exchanges are popular in cultures around the world. In certain versions of a randomized gift exchange, each participant is partnered with another participant who will give them a gift, i.e., a donor, and someone they will give a gift to, i.e., a donee. Participants usually do not know who has been assigned to give them a gift. Part of the game is that each participant is both a surprise giver and a surprised receiver. An important part of randomized gift exchanges is the secrecy and element of surprise when the recipient receives a gift, from a sometimes unknown gift giver. In some gift exchange rituals, the gift giver always remains unknown.

The current state of the art for randomized gift exchanges is very basic. Commonly, people rely on simple, even rudimentary ways of matching participants with a gift exchange partner randomly. Typically, one person, the event organizer, manages the entire process with often laborious involvement, including creating slips of paper with participant names written on them and manually drawing matches "from a hat" and so on.

In recent years, a few online randomized gift exchange sites have been developed, typically offering a simple computer system that matches participants in a gift exchange. In general, these sites serve a very small user base, and do not offer social gifting, social wishing and communication features, or other features that help event organizers manage and coordinate complex situations such as large randomized exchanges, workplace exchanges, exchanges within communities (online, special interest groups, etc.) in which participants may not know one another, wedding and baby showers, and so on.

Moreover, these simple systems do not have features that address complexities common to many randomized gift exchanges and other online large group coordination tasks—such as unanticipated, late-in-the-game changes to the participant mix. If an invited guest RSVPs after the draw, if someone new is invited after the draw, if someone drops out of the event after the draw—if any change to the participant group occurs after the names are matched and drawn—these systems cannot manage such flux. The present invention solves this problem.

To look at the related art for another aspect of the field of the invention, some online group games, such as online "fantasy" sports games (e.g., Fantasy Football, Fantasy Hockey, etc.) are evolving in sophistication and many still have common issues that can be solved with the present invention. Fantasy sports games involve multiple participants, a draw related to the order in which participants can choose players for their fantasy team, other complicated rules related to the draft, and a group of participants matched to privileges that become complicated and invalid when there are changes after the initial draw. The current state of the art of these games ranges widely from the most basic—manual, non-computerized, involving cards and much coordination on the part of an organizer—to sophisticated online systems. But many of these more sophisticated systems still struggle with how to manage changes to the group of participants after the initial draw.

SUMMARY OF THE INVENTION

Various embodiments of the invention provide methods and supporting systems that simplify the organizing, communicating, managing and/or tasks that are part of games and rituals such as online gift planning and giving, and group coordination. Specifically, the techniques described herein facilitate the management of online randomized gift exchange games in which participants are matched via "draw" to gift exchange partners, and coordinating changes to the participant pool after the draw or the game starts.

The system can also be used to manage the coordination of participants in other online "games" wherein the participants are matched (for example, via draw or draft) with other participants, and some participants join or leave after being matched.

An object of the present invention is to provide systems and methods that allow additions to or deletions from the group of participants in an online randomized gift exchange or other online group game involving a draw and matching of participants with other participants or with certain privileges, after the draw has occurred.

Another object of the present invention is to provide systems and methods that allow an infinite number of additions or deletions among participants in the group, up until the actual gift exchange date.

A further object of the present invention is to provide systems and methods that allow these changes to happen within the participant group with a minimum disruption to the original participants who have already been assigned a match, e.g., a gift exchange partner, a set of privileges, and the like, in the draw.

Yet another object of the present invention is to minimize participant match changes in the original draw assignment. With the present invention, any participant additions or deletions will affect only one or none of the original participants.

Therefore, in a first aspect, a computer-implemented method is described that uses network-enabled computers having one or more processors to enable a second number of participants to participate in an event after completion of an initial assignment of roles to a first set of participants, wherein a number and an identity of at least one participant in the second number differ from a number and identity of participants in the first set.

In some embodiments, the method includes assigning a role to each participant in the first set of participants, wherein the role includes a match between a discrete donor from the first set of participants and a discrete donee from the first set of participants, notifying each participant from the first set of participants of their assigned role, and identifying at least one new participant requesting to participate in the event. If there are multiple new participants, the method includes adding each new participant to a second number of participants, assigning a role to each new participant in the second number of participants, wherein the role includes a match between a discrete donor from the second number of participants and a discrete donee from the second number of participants, and notifying each new participant from the second number of participants of their assigned role. Otherwise, if there is only one new participant, the method includes selecting a donor-donee assigned match from the first set of participants, identifying the discrete donor and the discrete donee of the selected donor-donee assigned match, reassigning the discrete donor of the selected donor-donee assigned match to the new participant, and assigning the discrete donee of the selected donor-donee assigned match to the new participant.

In one variation, participants are identified from the first set of participants requesting removal from the participant's assigned role. For each participant requesting removal, the discrete donor and the discrete donee of the participant requesting removal are identified and reassigned a replacement role match between the discrete donor and the discrete donee. In some implementations, the method includes removing from the first set of participants each participant requesting removal. In another implementation, reassigning the discrete donor to the discrete donee includes notifying the discrete donor about the removed participant and about a new role with the discrete donee.

In another variation of some embodiments, new participants are identified from the second number of participants requesting removal from the new participant's assigned role. For each new participant requesting removal, the discrete donor and the discrete donee of the new participant requesting removal are identified and the discrete donor is then reassigned to the discrete donee. In one implementation, reassigning the discrete donor of the selected donor-donee assigned match to the new participant includes notifying the discrete donor of the selected donor-donee assigned match about the new participant. In still another variation, assigning the discrete donee of the selected donor-donee assigned match to the new participant includes notifying the new participant of their assigned role.

In a second aspect, a system is provided for enabling a second number of participants to participate in an event after completion of an initial assignment of roles to a first set of participants, wherein a number and an identity of at least one participant in the second number differ from a number and identity of participants in the first set. In some embodiments, the system includes a memory for storing computer-readable instructions and a processing device that is capable of executing the computer-readable instructions.

In some variations, execution of the computer-readable instructions by the processing device assigns a role to each participant in the first set of participants using the processing device, wherein the role includes a match between a discrete donor from the first set of participants and a discrete donee from the first set of participants and notifies each participant from the first set of participants of their assigned role. The instructions identify at least one new participant requesting to participate in the event, and if there are multiple new participants, each new participant is added to a second number of participants and assigned a role to each new participant in the second number of participants. The role includes a match between a discrete donor from the second number of participants and a discrete donee from the second number of participants, and notify each new participant from the second number of participants of their assigned role. Otherwise, if there is only one new participant, the processing device is adapted to select a donor-donee assigned match from the first set of participants, identify the discrete donor and the discrete donee of the selected donor-donee assigned match, reassign the discrete donor of the selected donor-donee assigned match to the new participant, and assign the discrete donee of the selected donor-donee assigned match to the new participant.

In some variations, the instructions identify any participant from the first set of participants requesting removal from the participant's assigned role and, for each participant requesting removal, identify the discrete donor and the discrete donee of the participant requesting removal, and reassign a replacement role match between the discrete donor and the discrete donee. In one implementation, the instructions remove from the first set of participants each participant requesting removal. In another implementation, reassigning the discrete donor to the discrete donee includes notifying the discrete donor about the removed participant and about a new role with the discrete donee.

In another variation, the instructions identify any new participant from the second number of participants requesting removal from the new participant's assigned role and, for each new participant requesting removal, identify the discrete donor and the discrete donee of the new participant requesting removal, and to reassign the discrete donor to the discrete donee. In one implementation reassigning the discrete donor of the selected donor-donee assigned match includes notifying the discrete donor of the selected donor-donee assigned match about the new participant.

In a third aspect, an article of manufacture having computer-readable program portions embedded thereon for performing an online random gift exchange is disclosed. In some embodiments, the program portions include instructions for assigning a role to each participant in the first set of participants using the processing device, wherein the role includes a match between a discrete donor from the first set of participants and a discrete donee from the first set of participants and notifying each participant from the first set of participants of their assigned role. The instructions identify at least one new participant requesting to participate in the event, and if there are multiple new participants, each new participant is added to a second number of participants and a role is assigned to each new participant in the second number of participants, wherein the role includes a match between a discrete donor from the second number of participants and a discrete donee from the second number of participants. Each new participant from the second number of participants is notified of their assigned role. Otherwise, if there is only one new participant, the instructions include selecting a donor-donee assigned match from the first plurality of participants, identifying the discrete donor and the discrete donee of the selected donor-donee assigned match, reassigning the discrete donor of the selected donor-donee assigned match to the new participant, and assigning the discrete donee of the selected donor-donee assigned match to the new participant.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE INVENTION

The present invention provides systems and methods for an online randomized gift exchange. The systems and methods of the present invention allow a mix of gift exchange participants to be changed, viz., added to or deleted from, after names have been drawn and partners or donor-donee matchings or pairings assigned in a first draw, in a subsequent mini re-draw that involves minimal disruption to the majority of participants whose names have already been drawn and whose roles have been assigned.

Specifically, the systems and methods of the present invention allow participants to be added to the randomized gift exchange after names have been drawn. For example, an event organizer can add the new people after the first draw at any time before the gift exchange date and the system manages the change automatically. When a single new participant is added (Participant A), only a single other participant (Participant B) is affected by the change and re-matched. More specifically, new Participant A becomes the assigned donor to the person (Participant C) that Participant B originally drew and Participant B is now the assigned donor to Participant A. Participant C's donee does not change. Each participant—the newly added one (Participant A) and the one selected to be reassigned (Participant B)—each receive notice of their draw assignment.

When two or more new participants are added to a gift exchange group, the new participants receive their draw assignment from within the group of new participants only. Consequently, not one of the original group of participants is affected by these additions. Subsequently, each new participant receives notice of their draw assignment.

According to certain embodiments of the present invention, people also may be removed from the randomized gift exchange after names have been drawn and donor-donees have been matched or paired. For example, an event organizer can remove the declining participants at any time before the gift exchange date and the system manages the change automatically. The organizer may remove one or multiple participants. From the organizer's perspective, it may appear that the system is reassigning all the names simultaneously. However, the system reassigns names one at a time and sequentially. Thus, when a participant is removed from the group after the first or any subsequent draw, the removed participant's original donee is transferred to the person who had drawn the removed participant, i.e., the removed participant's donor. The removed participant's donor who receives a new done is then notified of the change.

In all instances, any subsequent draw is in effect a "mini re-draw" because it affects at most one and in some cases none of the already drawn and assigned gift exchange participants, i.e., donor-donee matchings or pairings. Advantageously, the system ensures that a minimal number of participants in the first group are affected by any change to the group. Moreover, until the gift exchange date occurs, the system can handle an infinite number of additions to or deletions from the group.

Figure 1A:
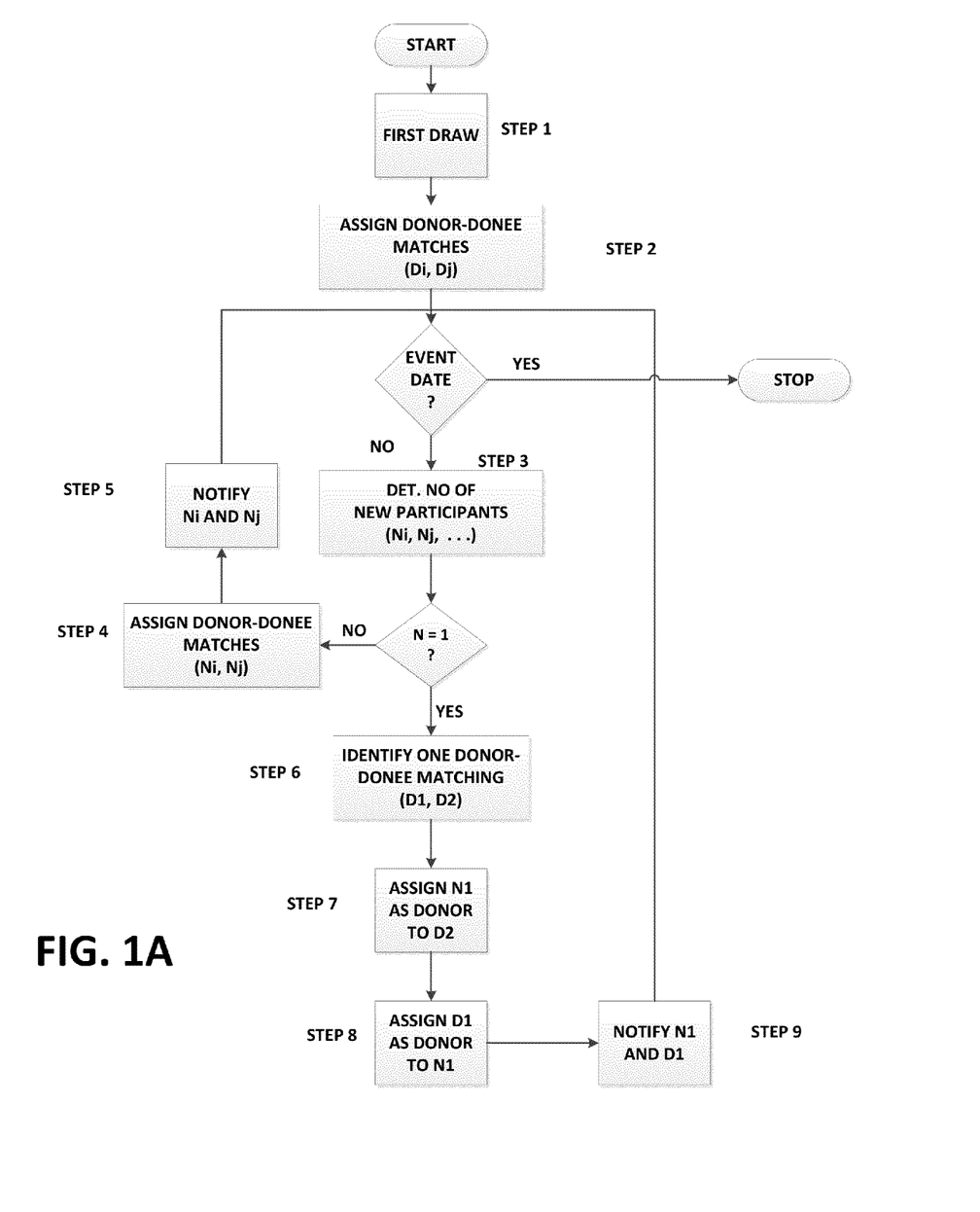
FIG. 1A shows a flow chart of an illustrative method for enabling a second number of participants to participate in an event after completion of an initial assignment of roles to a first plurality of participants in accordance with the present invention.

FIG. 1A depicts an illustrative flow chart of a method of enabling a second number of participants to participate in an event after completion of an initial assignment of roles to a first group or set of participants. The method enables gift exchange organizers to add a participant(s) after the initial draw has occurred (STEP 1) and the participants have been assigned partners (STEP 2). Although the invention will be described assuming that the event is a gift exchange, e.g., a Silent Santa, the invention is not to be construed as being limited thereto. Those of ordinary skill in the art can appreciate the teachings of the present invention and apply those teachings to other similar events.

One or more participants may be added until the gift exchange date occurs, after which further additions are not possible. After participants of the first draw (STEP 1) have been assigned a role (STEP 2), which is to say that each donor-participant ($D_i$) has been assigned to a donee-participant ($D_j$), the system looks for new participants ($N_i$, $N_j$, ...) who have expressed a desire to participate in the event (STEP 3). How the system handles assigning roles to new participants is determined by the number of new participants (N). For example, if the number of new participants (N) is greater than one (1), a mini-draw using the pool of multiple new participants is conducted and each new participant is assigned a role (STEP 4), which is to say that each new donor-participant ($N_i$) is assigned to a new donee-participant ($N_j$). Once matches or pairings of partners ($N_i$, $N_j$) have been made, each of the new participants (N) is notified of his or her donee/recipient (STEP 5).

Advantageously, by assigning donor-donee partners amongst the group of previously unassigned, i.e., new, participants, there is no disruption to the existing draw assignments from the first draw (STEP 1). Hence, none of the original participants ($D_i$, $D_j$, ...) are affected or involved or even made aware of the additions. Moreover, the system can loop through an infinite number of participant additions before the gift exchange date occurs. Subsequent mini-draws may occur on a timed basis, e.g., using the event date and time as a reference, and/or based on a number of new participants seeking to participate. For example, a mini-draw may occur 24 or 48 hours before event date and time and/or a mini-draw may occur as soon as two new participants express a desire to participate.

When the number of new participants (N) is equal to one (1), gift partner assignments (STEP 2) from the first draw (STEP 1) remain largely unchanged. However, if there is only one unassigned, i.e., new, participant, then the system matches, assigns or pairs the new participant with a partner from within the existing gift exchange group. To accomplish this, the system identifies a single donor-donee matching or pairing ($D_1$, $D_2$) (STEP 6) from the first draw (STEP 1) and matches, assigns or pairs the new participant ($N_1$) as the donor to the original donee ($D_2$) (STEP 7) and matches, assigns or pairs the original donor ($D_1$) as the donor to the new participant (N') (STEP 8). Once matches or pairings of partners ($N_1$, $D_2$) and ($D_1$, $N_1$) have been established, the new participant ($N_1$) is notified of his or her donee/recipient ($D_2$) and the original donor ($D_1$) is notified of his or her new donee/recipient ($N_1$) (STEP 9). Only the original donor ($D_1$) is "inconvenienced." Advantageously, until the event date and time, the system can loop through an infinite number of late participant RSVPs.

Figure 1B:
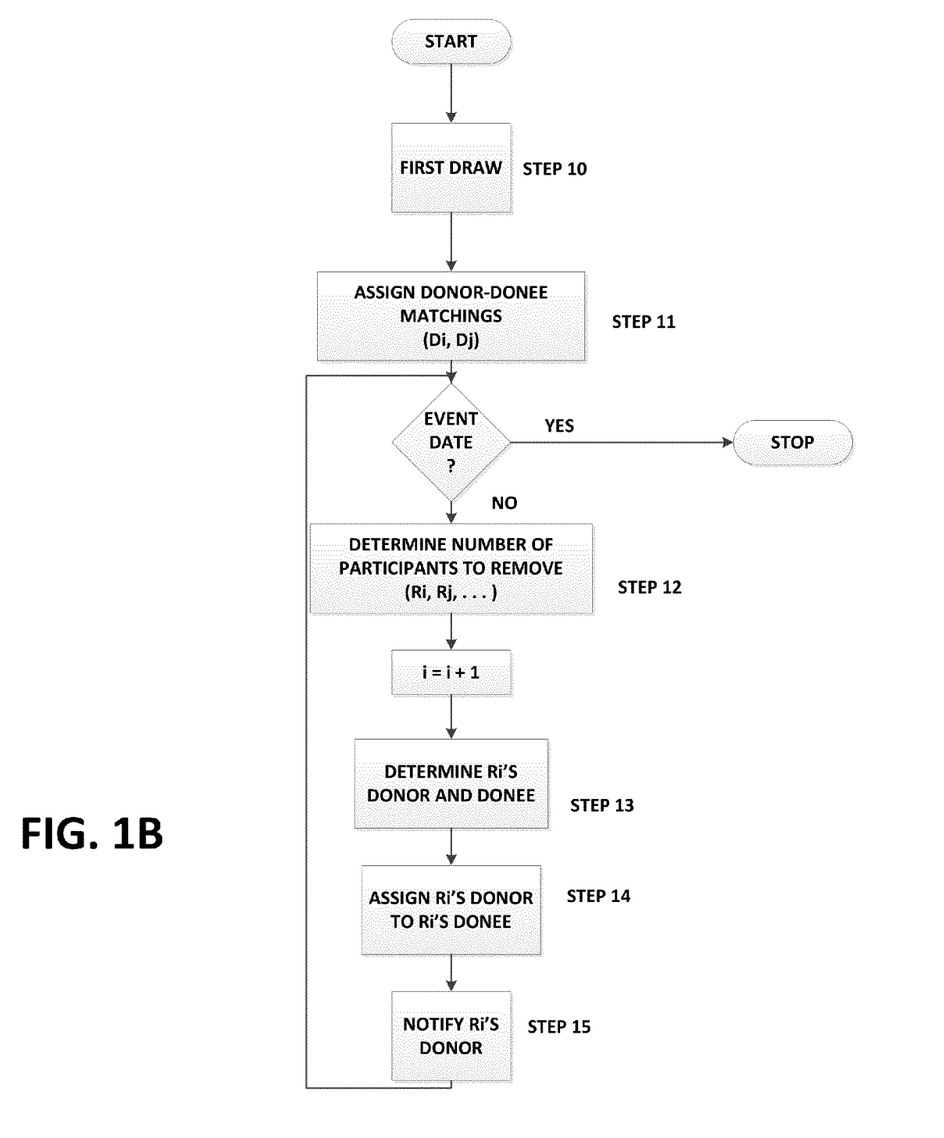
FIG. 1B shows a flow chart of an illustrative method for enabling a participant to withdraw her participation in an event after completion of an initial assignment of roles in accordance with the present invention.

The system is also capable of reassigning donor-donee matchings or pairings, in the event that, after a first draw, an original participant desires for whatever reason not to participate. Referring to FIG. 1B, a flow chart depicting an illustrative embodiment of a method for reassigning donors and donees from within the pool when an original participant ($D_i$) expresses a desire not to participate. After participants of the first draw (STEP 10) have been assigned a role (STEP 11), which is to say that each donor-participant ($D_i$) has been assigned to a donee-participant ($D_j$), the system looks for participants who desire to be removed from the pool ($R_i$, $R_j$, ...) by expressing a desire to not participate in the event (STEP 12). Although to the organizer, it may seem that the system removes and reassigns multiple original participants at the same time, preferably, the system automatically removes participants then reassigns their partner sequentially, one at a time, to ensure minimal disruption to the gift exchange.

More specifically, after the system identifies participants wishing to be removed from the pool ($R_i$, $R_j$, ...) (STEP 12), the system identifies the donor ($D_1$, $R_i$) and donee ($R_i$, $D_2$) matchings or pairings of the participant to be removed (STEP 13). To minimize disruption, the donor ($D_1$) of the participant to be removed ($R_i$) is automatically assigned as the donor of the donee ($D_2$) of the participant to be removed ($R_i$) (STEP 14). The system automatically sends a notification to the participant ($D_1$) who was originally assigned to give a gift to the removed participant ($R_i$) (STEP 15). Advantageously, until the gift exchange date is reached, the system can handle an infinite number of participant removals.

System Architecture

An online system and platform for social gifting and wishing, online randomized gift exchanges, social networking, online communication, and online group coordination and games are disclosed. The system architecture is designed to address accuracy and speed deficiencies in the prior art approaches.

The terms and expressions employed herein are used as terms and expressions of description and not of limitation, and there is no intention, in the use of such terms and expressions, of excluding any equivalents of the features shown and described or portions thereof.

Figure 2:
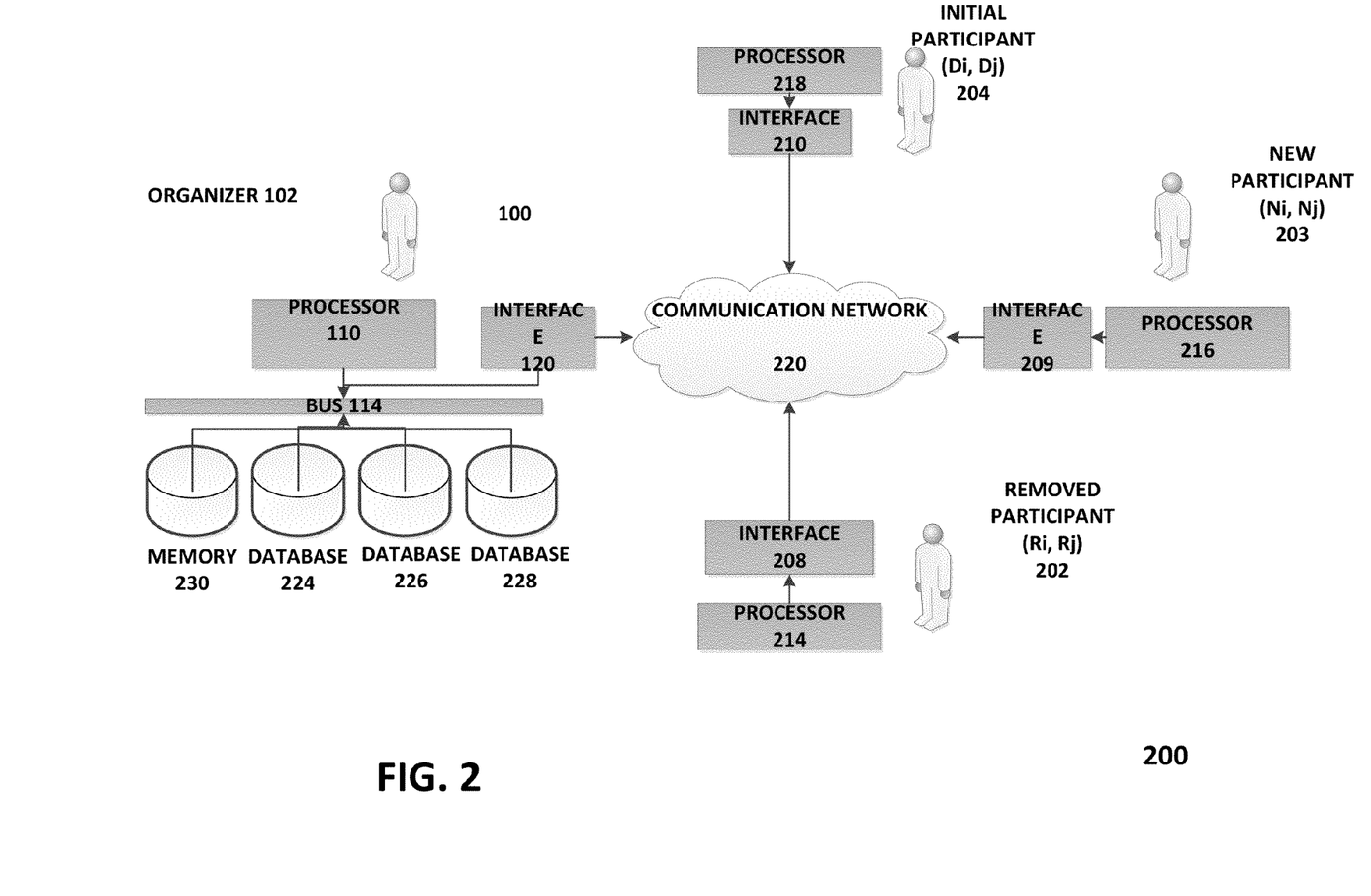
FIG. 2 shows an illustrative embodiment of a system for enabling a second number of participants to participate in an event after completion of an initial assignment of roles to a first plurality of participants via a network in accordance with the present invention.

Referring to FIG. 2, an illustrative embodiment of system architecture 200 for the platform is shown. The system 200 involves the interaction and input of an organizer 102, multiple participants 202, 203, and 204, and a processing device 100 via a communication network 220. The particular configuration of the system 200 depicted in FIG. 2 is used for illustration purposes only and embodiments of the invention may be practiced in other contexts. Thus, the invention is not limited to a specific number of users or systems.

The system 200 may, for example, comprise a number of participant interfaces 208, 209, and 210, processing systems 214, 216, and 218, a communications network 220, the system platform 100, a system interface 120, data storage for participant data 224, data storage for initial participant matchings or pairings 226, data storage for subsequent participant matchings and pairings 228, and memory 230. The system 200 is structured and arranged to enable participants 202, 203, and 204 to interact with participant interfaces 208, 209, and 210, respectively, and an organizer 102 to interact with a system interface 120. The system 200 is further adapted to enable the system 100 to interact with the data storage for the participant data 224, the data storage for initial participant matchings or pairings 226, the data storage for subsequent participant matchings or pairings 228, and memory 230 to provide the online gift exchange platform.

According to the depicted embodiment, interfaces 208, 209, and 210 may be browser-based user interfaces served by the system 100 and may be rendered by processing systems 214, 216, and 218, respectively. In one aspect of the embodiment, the browser-based participant interfaces 208, 209, and 210 are Web-enabled cellphones. The processing systems 214, 216, and 218 may be interconnected with one another and the system platform 100 via a network 220. The network 220 may include any communication network through which member computer systems may exchange data, e.g., the World, Wide Web, the Internet, an intranet, a wide area network (WAN), a local area network (LAN), and so forth.

The sundry computer systems shown in FIG. 1, which include processing systems 214, 216, and 218, system platform 100, and the communication network 220, each may include one or more processing devices. The participant interfaces 208, 209, and 210 are processing devices that enable participants 202, 203, and 204 and organizers 102 to interact with system platform 100 via the network 220. Various aspects and functions described herein in accord with the present invention may be implemented as hardware or software on one or more processing device.

There are many examples of processing devices currently in use including network appliances, personal computers, workstations, mainframes, networked clients, servers, media servers, application servers, database servers, and web servers. Other examples of processing devices may include mobile computing devices, such as cellphones, personal digital assistants, and network equipment, such as load balancers, routers, and switches. For participants at the low end of the economic scale, low-cost, Web-enabled cellphones are envisioned as processing devices. Furthermore, aspects in accordance with the present invention may be located on a single processing system or may be distributed among a plurality of systems connected to one or more communications networks.

Various aspects and functions may be distributed among one or more processing systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Moreover, aspects may be implemented in software, hardware or firmware, or any combination thereof. Thus, aspects in accord with the present invention may be implemented within methods, acts, systems, system elements, and components using a variety of hardware and software configurations, and the invention is not limited to any particular distributed architecture, network, or communication protocol. To exchange data via a communication network, system platform 100, the processing systems 214, 216, and 218 and network 220 itself may use various methods, protocols, and standards, including, inter alia, token ring, Ethernet, TCP/IP, UDP, HTTP, FTP, and SNMP The processor 110 of the system platform 100 may be a commercially available processor such as an Intel Core, Motorola PowerPC, MIPS, UltraSPARC, or Hewlett-Packard PA-RISC processor, but may be any type of processor or controller as many other processors, microprocessors, and controllers are available. The processor 110 is structured and arranged to perform a series of instructions, e.g., an application, an algorithm, a driver program, and the like, that result in manipulated data.

System platform 100 may be a computer system including an operating system that manages at least a portion of the hardware elements included therein. Usually, a processor or controller, such as processor 110, executes an operating system which may be, for example: a Windows-based operating system, e.g., Windows 7, Windows 2000 (Windows ME), Windows XP operating systems, and the like, available from the Microsoft Corporation, a MAC OS System X operating system available from Apple Computer, one of many Linux-based operating system distributions, e.g., the Enterprise Linux operating system, available from Red Hat Inc., or a UNIX operating system available from various sources. Many other operating systems may be used, and embodiments are not limited to any particular implementation.

The processor 110 and operating system together define a processing platform 100 for which application programs in high-level programming languages may be written. These component applications may be executable, intermediate (for example, C–) or interpreted code which communicate over a communication network (for example, the Internet) using a communication protocol (for example, TCP/IP). Similarly, aspects in accordance with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used.

Additionally, various aspects and functions in accord with the present invention may be implemented in a non-programmed environment, e.g., documents created in HTML, XML or other format that, when viewed in a window of a browser program, render aspects of a graphical-user interface or perform other functions. Furthermore, various embodiments in accordance with the present invention may be implemented as programmed or non-programmed elements, or any combination thereof. For example, a Web page may be implemented using HTML while a data object called from within the web page may be written in C++. Thus, the invention is not limited to a specific programming language. Indeed, any suitable programming language could be used.

A processing system included within an embodiment may perform functions outside the scope of the invention. For instance, aspects of the system may be implemented using an existing commercial product, such as, for example, Database Management Systems such as SQL Server available from Microsoft of Seattle, Wash., and Oracle Database from Oracle of Redwood Shores, Calif. or integration software such as Web Sphere middleware from IBM of Armonk, N.Y. However, a computer system running, for example, SQL Server may be able to support both aspects in accordance with the present invention and databases for sundry applications not within the scope of the invention.

Memory 230 may be used for storing programs and data during operation of system platform 100. Thus, memory 230 may be a relatively high performance, volatile, random access memory such as a dynamic random access memory (DRAM) or static memory (SRAM). However, memory 230 may include any device for storing data, such as a disk drive or other non-volatile storage device. Various embodiments in accordance with the present invention may organize memory 230 into particularized and, in some cases, unique structures to perform the aspects and functions disclosed herein. Data storage for participant data 224, the data storage for initial participant matchings or pairings 226, and the data storage for subsequent participant matchings or pairings 228 can be components or elements of memory 230 or, in the alternate, can be stand-alone devices.

Components of the system platform 100 may be coupled by an interconnection element such as a bus 114. The bus 114 may include one or more physical busses, e.g., between components that are integrated within a same machine, but may also include any communication coupling between system elements, e.g., specialized or standard computing bus technologies such as IDE, SCSI, PCI, and InfiniBand. Thus, the bus 114 enables communications, e.g., the transfer of data and instructions, to be exchanged between System components.

System platform 100 also includes one or more interface devices 120 such as input devices, output devices, and/or combined input/output devices. Interface devices 120 enable organizers 102 to employ the system platform 100 to exchange information and communicate with external entities, such as other processing systems 214, 216, and 218, and websites via the network 220. Interface devices 120 are adapted to receive input or to provide output. More particularly, output devices may render information for external presentation, for example, on display devices. Input devices may accept information from external sources. Examples of interface devices include keyboards, mouse devices, trackballs, microphones, touch screens, printing devices, display screens, speakers, network interface cards, and so forth.

As discussed in greater detail above, the system platform 100 is structured and arranged to receive requests from a multiplicity of initial participants 204 to participate in an online event; to create an initial draw of initial participants; to assign roles, e.g., donee-donor roles, to each initial participant 204; to identify new participants 203 desiring to participate in the online event after the initial draw; to create a subsequent draw(s) of new participants 203; to assign roles, e.g., donee-donor roles, to each new participant 203 and at most one initial participant 204; to notify all initial participants 204 and all new participants 203 of their roles; to identify participants 202 desiring not to participate in the online event after the initial draw; to reassign roles to account for removed participants 202; and to notify any participants 203 and 204 of any change in their roles as a donor.

Various embodiments and features of the present invention have been described in detail with particularity. The utilities thereof can be appreciated by those skilled in the art. It should be emphasized that the above-described embodiments of the present invention merely describe certain examples implementing the invention, including the best mode, in order to set forth a clear understanding of the principles of the invention. Numerous changes, variations, and modifications can be made to the embodiments described herein and the underlying concepts, without departing from the spirit and scope of the principles of the invention. All such variations and modifications are intended to be included within the scope of the present invention, as set forth herein. The scope of the present invention is to be defined by the claims, rather than limited by the forgoing description of various preferred and alternative embodiments. Accordingly, what is desired to be secured by Letters Patent is the invention as defined and differentiated in the claims, and all equivalents.

What is claimed is:

1. A computer-implemented method of enabling a second number of participants to participate in an event after completion of an initial assignment of roles to a first plurality of participants, wherein a number and an identity of at least one participant in the second number differ from a number and identity of participants in the first plurality via a network using a computer having a processing device and memory, the method comprising:

assigning a role to each participant in the first plurality of participants using the processing device, wherein the role comprises a match between a discrete donor from the first plurality of participants and a discrete donee from the first plurality of participants;

notifying each participant from the first plurality of participants of their assigned role;

identifying at least one new participant requesting to participate in the event;

if there are multiple new participants:
   adding each new participant to a second number of participants,
   assigning a role to each new participant in the second number of participants, wherein the role comprises a match between a discrete donor from the second number of participants and a discrete donee from the second number of participants, and
   notifying each new participant from the second number of participants of their assigned role;
otherwise, if there is only one new participant:
   selecting a donor-donee assigned match from the first plurality of participants;
   identifying the discrete donor and the discrete donee of the selected donor-donee assigned match;
   reassigning the discrete donor of the selected donor-donee assigned match to the new participant; and
   assigning the discrete donee of the selected donor-donee assigned match to the new participant.

2. The method of claim 1 further comprising:
identifying any participant from the first plurality of participants requesting removal from the participant's assigned role;
for each participant requesting removal, identifying the discrete donor and the discrete donee of the participant requesting removal; and
reassigning a replacement role match between the discrete donor and the discrete done.

3. The method of claim 2 further comprising removing from the first plurality of participants each participant requesting removal.

4. The method of claim 3, wherein reassigning the discrete donor to the discrete donee includes notifying the discrete donor about the removed participant and about a new role with the discrete donee.

5. The method of claim 1 further comprising:
identifying any new participant from the second number of participants requesting removal from the new participant's assigned role;
for each new participant requesting removal, identifying the discrete donor and the discrete donee of the new participant requesting removal; and
reassigning the discrete donor to the discrete donee.

6. The method of claim 1, wherein reassigning the discrete donor of the selected donor-donee assigned match to the new participant includes notifying the discrete donor of the selected donor-donee assigned match about the new participant.

7. The method of claim 1, wherein assigning the discrete donee of the selected donor-donee assigned match to the new participant includes notifying the new participant of their assigned role.

8. A system for enabling a second number of participants to participate in an event after completion of an initial assignment of roles to a first plurality of participants, wherein a number and an identity of at least one participant in the second number differ from a number and identity of participants in the first plurality via a network, the system comprising:
a memory for storing computer-readable instructions; and
a processing device that is capable of executing the computer-readable instructions, wherein the processing device is adapted to:
   assign a role to each participant in the first plurality of participants using the processing device, wherein the role comprises a match between a discrete donor from the first plurality of participants and a discrete donee from the first plurality of participants;
   notify each participant from the first plurality of participants of their assigned role via the network;
   identify at least one new participant requesting to participate in the event;
   if there are multiple new participants:
     add each new participant to a second number of participants,
     assign a role to each new participant in the second number of participants, wherein the role comprises a match between a discrete donor from the second number of participants and a discrete donee from the second number of participants, and
     notify each new participant from the second number of participants of their assigned role;
   otherwise, if there is only one new participant:
     select a donor-donee assigned match from the first plurality of participants;
     identify the discrete donor and the discrete donee of the selected donor-donee assigned match;
     reassign the discrete donor of the selected donor-donee assigned match to the new participant; and
     assign the discrete donee of the selected donor-donee assigned match to the new participant.

9. The system of claim 8, wherein the processing device is further adapted to:
identify any participant from the first plurality of participants requesting removal from the participant's assigned role;
for each participant requesting removal, identify the discrete donor and the discrete donee of the participant requesting removal; and
reassign a replacement role match between the discrete donor and the discrete done.

10. The method of claim 9 wherein the processing device is further adapted to remove from the first plurality of participants each participant requesting removal.

11. The method of claim 9, wherein reassigning the discrete donor to the discrete donee includes notifying the discrete donor about the removed participant and about a new role with the discrete donee.

12. The method of claim 8, wherein the processing device is further adapted to:
identify any new participant from the second number of participants requesting removal from the new participant's assigned role;
for each new participant requesting removal, identify the discrete donor and the discrete donee of the new participant requesting removal; and
reassign the discrete donor to the discrete donee.

13. The method of claim 12, wherein reassigning the discrete donor of the selected donor-donee assigned match includes notifying the discrete donor of the selected donor-donee assigned match about the new participant.

14. An article of manufacture having computer-readable program portions embedded thereon for performing an online random gift exchange, the program portions comprising instructions for:
assigning a role to each participant in the first plurality of participants using the processing device, wherein the role comprises a match between a discrete donor from the first plurality of participants and a discrete donee from the first plurality of participants;
notifying each participant from the first plurality of participants of their assigned role;

identifying at least one new participant requesting to participate in the event;
if there are multiple new participants:
- adding each new participant to a second number of participants,
- assigning a role to each new participant in the second number of participants, wherein the role comprises a match between a discrete donor from the second number of participants and a discrete donee from the second number of participants, and
- notifying each new participant from the second number of participants of their assigned role;

otherwise, if there is only one new participant:
- selecting a donor-donee assigned match from the first plurality of participants;
- identifying the discrete donor and the discrete donee of the selected donor-donee assigned match;
- reassigning the discrete donor of the selected donor-donee assigned match to the new participant; and
- assigning the discrete donee of the selected donor-donee assigned match to the new participant.

* * * * *